US012756209B2

(12) United States Patent
Li et al.

(10) Patent No.: US 12,756,209 B2
(45) Date of Patent: Oct. 6, 2026

(54) BATTERY CONTROL CIRCUITRY, BATTERY CONTROL METHOD, AND ELECTRIC APPARATUS

(71) Applicant: CONTEMPORARY AMPEREX TECHNOLOGY (HONG KONG) LIMITED, Hong Kong (CN)

(72) Inventors: Xiangtao Li, Ningde (CN); Bao Li, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 878 days.

(21) Appl. No.: 18/111,895

(22) Filed: Feb. 21, 2023

(65) Prior Publication Data

US 2023/0216316 A1 Jul. 6, 2023

Related U.S. Application Data

(63) Continuation of application No. PCT/CN2021/142931, filed on Dec. 30, 2021.

(51) Int. Cl.

*H02J 7/50* (2026.01)
*H01M 10/42* (2006.01)

(Continued)

(52) U.S. Cl.

CPC ........... *H02J 7/575* (2026.01); *H01M 10/425* (2013.01); *H01M 10/48* (2013.01); *H02J 7/685* (2026.01);

(Continued)

(58) Field of Classification Search

CPC ..................................................... H02J 7/0024

(Continued)

(56) References Cited

U.S. PATENT DOCUMENTS

2001/0005125 A1* 6/2001 Nagai .................. H02J 7/0013 320/118
2002/0140397 A1 10/2002 Hasegawa et al.

(Continued)

FOREIGN PATENT DOCUMENTS

CN 1302091 A 7/2001
CN 202076380 U 12/2011

(Continued)

OTHER PUBLICATIONS

Office Action issued Aug. 18, 2025 in Japanese Patent Application No. 2022-534653 (Appeal No. 2024-018483) with English translation thereof.

(Continued)

*Primary Examiner* — Yalkew Fantu
(74) *Attorney, Agent, or Firm* — XSENSUS LLP

(57) ABSTRACT

Embodiments of this application provide a battery control circuitry, a battery control method, and an electric apparatus. The battery control circuitry may include a charging interface, a switch circuit, a first battery pack; a second battery pack, where a positive electrode of the second battery pack may be connected to a negative electrode of the first battery pack; and a control circuit, configured to: when detecting that the charging interface receives a charging signal from a low-voltage platform, control the switch circuit to switch to a first connection state, where in the first connection state, a target battery pack may be connected in series to the charging interface to form a first loop, so as to charge the target battery pack, where the target battery pack may be the first battery pack or the second battery pack.

19 Claims, 6 Drawing Sheets

(51) Int. Cl.
*H01M 10/48* (2006.01)
*H02J 7/60* (2026.01)
*H02J 7/90* (2026.01)

(52) U.S. Cl.
CPC ......... *H02J 7/933* (2026.01); *H01M 2220/20* (2013.01)

(58) Field of Classification Search
USPC ........................................................ 320/124
See application file for complete search history.

(56) References Cited

U.S. PATENT DOCUMENTS

| | | | |
|---|---|---|---|
| 2016/0036250 A1 | 2/2016 | Cho et al. | |
| 2020/0185936 A1 | 6/2020 | Oishi et al. | |
| 2021/0359535 A1* | 11/2021 | Tseng | H02J 7/0024 |
| 2021/0367431 A1 | 11/2021 | Yoshida et al. | |
| 2021/0376618 A1* | 12/2021 | Chen | H01M 10/441 |
| 2022/0224125 A1* | 7/2022 | Thorsøe | H02J 7/0048 |
| 2022/0231537 A1 | 7/2022 | Hirota et al. | |

FOREIGN PATENT DOCUMENTS

| | | | |
|---|---|---|---|
| CN | 102522602 | A | 6/2012 |
| CN | 104901409 | A | 9/2015 |
| CN | 107994659 | A | 5/2018 |
| CN | 108879854 | A | 11/2018 |
| CN | 109787329 | A | 5/2019 |
| CN | 109980713 | A | 7/2019 |
| CN | 111546944 | A | 8/2020 |
| CN | 214176934 | U | 9/2021 |
| EP | 1113563 | A2 | 7/2001 |
| EP | 3 978 307 | A1 | 4/2022 |
| JP | 2001-186668 | A | 7/2001 |
| JP | 2005-143221 | A | 6/2005 |
| JP | 2014-103806 | A | 6/2014 |
| JP | 2020-150784 | A | 9/2020 |
| KR | 20010062697 | A | 7/2001 |
| WO | 2020/230202 | A1 | 11/2020 |
| WO | 2020/244465 | A1 | 12/2020 |

OTHER PUBLICATIONS

Notice of Reasons for Refusal issued Feb. 26, 2024 in Japanese Patent Application No. 2022-534653 with computer-generated English translation.
International Search Report mailed on Jul. 29, 2022, received for PCT Application PCT/CN2021/142931, filed on Dec. 30, 2021, 6 pages including English Translation.
Office Action issued Jul. 1, 2024 in Korean Patent Application No. 10-2022-7019287 with English translation thereof.
Extended European Search Report issued May 4, 2023 in European Patent Application No. 21921634.8, 12 pages.
Notice of Allowance mailed on Jul. 2, 2026, received for CN Application 202180054998.1, 7 pages including English Translation.

* cited by examiner

BATTERY CONTROL CIRCUITRY, BATTERY CONTROL METHOD, AND ELECTRIC APPARATUS

CROSS-REFERENCE TO RELATED APPLICATION

The present application is a continuation of International Application No. PCT/CN2021/142931, filed Dec. 30, 2021, the entire contents of which is incorporated herein by reference in its entirety.

TECHNICAL FIELD

This application relates to the field of energy storage components, and in particular, to a battery control circuitry, a battery control method, and an electric apparatus.

BACKGROUND

With the development of new energy technologies, application of batteries becomes wider, particularly in new energy vehicles. To implement fast charging of batteries, new energy vehicle vendors have gradually strengthened construction of battery charging platforms, and therefore high-voltage charging platforms emerge. Charging piles adapting to the high-voltage charging platforms are not prevalent yet. For this reason, batteries used in vehicles need to be compatible with charging piles with many types of voltage platform specifications.

In related technologies, a voltage boosting module is specially added to new energy vehicles. When it is connected to a low-voltage platform, the voltage boosting module boosts a charging voltage from the low-voltage platform to charge batteries. However, this solution increases costs.

SUMMARY

Embodiments of this application provide a battery control circuitry, a battery control method, and an electric apparatus, so as to resolve the problem of higher costs caused by specially disposing a voltage boosting module in new energy vehicles for proper battery charging in the related technologies.

According to one aspect, this application provides a battery control circuitry, including: a charging interface, a switch module, a first battery pack, a second battery pack, and a control module. A positive electrode of the second battery pack is connected to a negative electrode of the first battery pack. The control module is configured to: when detecting that the charging interface receives a charging signal from a low-voltage platform, control the switch module to switch to a first connection state, where in the first connection state, a target battery pack is connected in series to the charging interface to form a first loop, so as to charge the target battery pack, and the target battery pack is the first battery pack or the second battery pack.

In the foregoing solution, the control module and the switch module are disposed. The control module is configured to: when detecting that the charging interface receives a charging signal from the low-voltage platform, control the switch module to switch to the first connection state, so that the target battery pack is connected in series to the charging interface to form the first loop, so as to charge the target battery pack, and the target battery pack is the first battery pack or the second battery pack. In this way, either of the two battery packs can be charged separately. This implements adaptive access of the charging signal from the low-voltage platform so that battery packs can be charged properly, reducing costs. Therefore, the problem of higher costs caused by specially disposing a voltage boosting module in new energy vehicles for proper battery charging in the related technologies is resolved.

In addition, only the control module and the switch module need to be disposed to implement proper battery charging, which features a simple structure and easy implementation. Based on this, the negative electrode of the first battery pack is directly connected to the positive electrode of the second battery pack to separate the switch module from the battery packs. This facilitates maintenance and reduces risks of battery pack disassembly.

In some embodiments, the control module is further configured to: when detecting that the charging interface receives a charging signal from a high-voltage platform, control the switch module to switch to a second connection state, and in the second connection state, the charging interface, the first battery pack, and the second battery pack are connected in series to form a second loop, so as to charge the first battery pack and the second battery pack.

In the foregoing solution, the control module switches the switch module according to the charging signal of the high/low-voltage platform received by the charging interface, so that the battery packs and the charging interface form the first loop or the second loop accordingly. In this way, the electric apparatus in which the battery packs are disposed can be adapted to different charging signals, so as to implement flexible charging mode and high adaptation.

In some embodiments, the switch module includes a first auxiliary switching unit, a second auxiliary switching unit, and a main switch unit.

The first auxiliary switching unit is connected to an output end of the main switch unit, a positive electrode of the first battery pack, and a positive electrode of the second battery pack. The first auxiliary switching unit is configured to: when a first trigger signal is received from the control module, conductively connect the output end of the main switch unit to the target battery pack. The first trigger signal is sent when the control module detects the charging signal from the low-voltage platform.

An input end of the main switch unit is connected to a positive electrode of the charging interface. The main switch unit is configured to turn on under triggering of the control module after the first auxiliary switching unit is conductively connected, so as to connect the positive electrode of the charging interface to the output end of the main switch unit.

The second auxiliary switching unit is connected to the negative electrode of the first battery pack, a negative electrode of the second battery pack, and a negative electrode of the charging interface. The second auxiliary switching unit is configured to turn on under triggering of the control module after the main switch unit is conductively connected, so as to connect the negative electrode of the target battery pack to the negative electrode of the charging interface.

In the foregoing solution, the first loop is eventually formed by sequentially connecting the first auxiliary switching unit, the main switch unit, and the second auxiliary switching unit. This helps improve charging safety.

In some embodiments, the control module is further configured to: after detecting that the charging interface receives the charging signal from the low-voltage platform, send the first trigger signal to the first auxiliary switching unit on condition that the first auxiliary switching unit and the second auxiliary switching unit are detected to be normal; or terminate a charging process of the target battery pack on condition that the first auxiliary switching unit and the second auxiliary switching unit are detected to be faulty. By means of checking the auxiliary switching units connected to the loop for the target battery pack, fault detection can be implemented before charging, so as to improve charging safety.

In some embodiments, the control module is further configured to: after sending the first trigger signal to the first auxiliary switching unit, terminate the charging process of the target battery pack on condition that the main switch unit is faulty; or send, on condition that the main switch unit is normal, a second trigger signal to trigger connection of the main switch unit. This helps check whether the switch unit on a main line works properly, and improves charging safety.

In some embodiments, the first auxiliary switching unit includes a first contactor and a second contactor. A first end of the first contactor is connected to the output end of the main switch unit, and a second end of the first contactor is connected to the positive electrode of the first battery pack. A first end of the second contactor is connected to the output end of the main switch unit, and a second end of the second contactor is connected to the positive electrode of the second battery pack.

The second auxiliary switching unit includes a third contactor and a fourth contactor. A first end of the third contactor is connected to the negative electrode of the charging interface, and a second end of the third contactor is connected to the negative electrode of the first battery pack. A first end of the fourth contactor is connected to the negative electrode of the charging interface, and a second end of the fourth contactor is connected to the negative electrode of the second battery pack.

In the foregoing solution, a connection structure setting of the first contactor to the fourth contactor provides optional structural designs for the first auxiliary switching unit and the second auxiliary switching unit, which implements flexible switchover between the first loop and the second loop. Furthermore, the contactors are separated from the first battery pack and the second battery pack, instead of being disposed between the first battery pack and the second battery pack. This facilitates maintenance and reduces disassembly risks of the battery packs.

In some embodiments, the main switch unit includes a fifth contactor. A first end of the fifth contactor is connected to the positive electrode of the charging interface, and a second end of the fifth contactor is connected to the first end of the first contactor. By using contactors as the main switch unit, high reliability can be achieved.

In some embodiments, the battery control circuitry further includes a first current protection module and a second current protection module. The first current protection module is connected to the output end of the main switch unit and the first end of the first contactor. A first end of the second current protection module is connected to the negative electrode of the first battery pack and the positive electrode of the second battery pack. A second end of the second current protection module is connected to the second end of the second contactor and the second end of the third contactor.

In the foregoing solution, when current to the charging interface is overlarge, the first current protection module can protect batteries and a line in which the batteries reside. The second current protection module can implement current multiplex protection when different target battery packs are used.

In some embodiments, the battery control circuitry further includes a high-voltage load and a bidirectional DC-DC module. The high-voltage load is disposed between the output end of the main switch unit and the negative electrode of the charging interface. A low-voltage-side port of the bidirectional DC-DC module is connected to a low-voltage power source, and a high-voltage-side port of the bidirectional DC-DC module is connected to the high-voltage load. This can ensure that the high-voltage load is in a charging state all the time, reducing pre-charge contactors and pre-charge resistors in a circuit.

According to another aspect, this application further provides an electric apparatus, and the electric apparatus includes the battery control circuitry in the foregoing aspect.

According to still another aspect, this application further provides a battery control method. The method is applied to the battery control circuitry in the foregoing aspect, including:

- when detecting that a charging interface receives a charging signal from a low-voltage platform, controlling a switch module to switch to connect in series to a target battery pack and the charging interface to form a first loop, so as to charge the target battery pack, where the target battery pack is a first battery pack or a second battery pack; or
- when detecting that the charging interface receives a charging signal from a high-voltage platform, controlling the switch module to switch to connect in series to the charging interface, the first battery pack and the second battery pack to form a second loop, so as to charge the first battery pack and the second battery pack.

The foregoing description is merely an overview of the technical solutions in this application. In order to better understand the technical means of this application to achieve implementation according to content of the specification, and to make the above and other objects, features and advantages of this application more obvious and easy to understand, the following describes specific embodiments of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
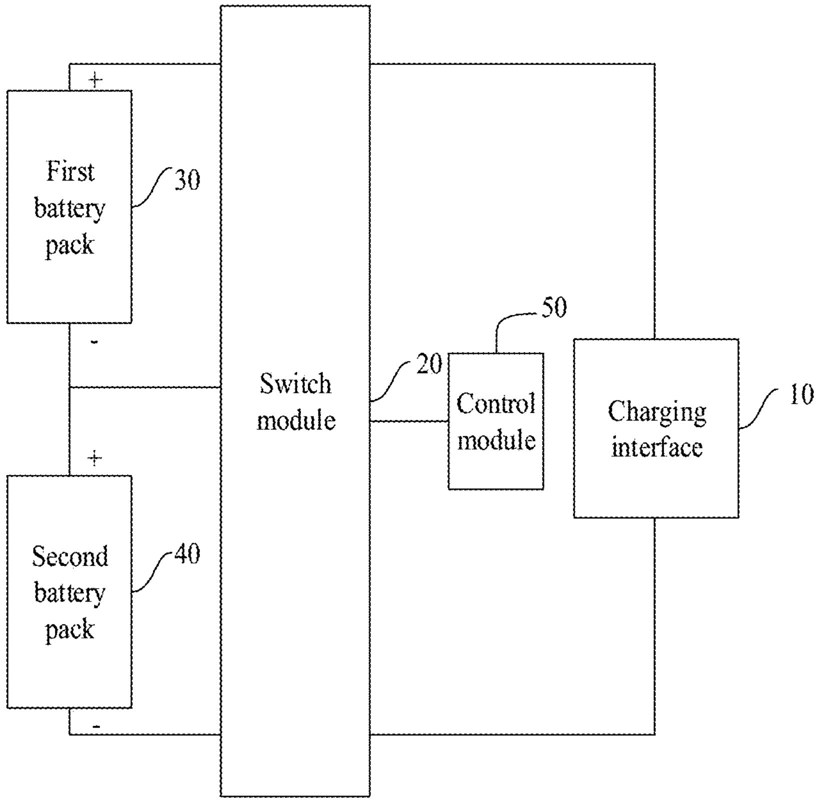
FIG. 1 is a schematic structural diagram of modules in a battery control circuitry according to an embodiment of this application.

In the accompanying drawings, the figures are not drawn to scale.

Reference signs: charging interface 10; switch module 20; first battery pack 30; second battery pack 40; control module 50; first auxiliary switching unit 21; main switch unit 22; second auxiliary switching unit 23; first contactor K1; second contactor K2; third contactor K3; fourth contactor K4; fifth contactor K5; first current protection module 51; second current protection module 52; high-voltage load 61; and bidirectional DC-DC module 62.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In descriptions of the embodiments of this application, the terms "first" and "second" and the like are merely intended to distinguish between different objects, and shall not be understood as an indication or implication of relative importance or implicit indication of the number, specific sequence or dominant-subordinate relationship of indicated technical features. In the descriptions of this application, "a plurality of" means at least two unless otherwise specifically stated.

The term "embodiment" described herein means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with other embodiments.

In the descriptions of the embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the descriptions of the embodiments of this application, term "a plurality of" means two (inclusive) or more. Similarly, "a plurality of groups" means two (inclusive) or more groups, and "a plurality of pieces" means two (inclusive) or more pieces.

In the descriptions of the embodiments of this application, the orientations or positional relationships indicated by the technical terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of the embodiments of this application and simplify the descriptions, are not intended to indicate or imply that the apparatuses or components mentioned in this application must have specific orientations, or be constructed and operated for a specific orientation, and therefore shall not be construed as a limitation to embodiments of this application.

In the descriptions of the embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this application based on specific situations.

In the new energy field, a traction battery may be used as a major traction source for an electric apparatus (such as a vehicle, a ship, or a spacecraft), and an energy storage battery may be a charging source for the electric apparatus. The importance of the traction battery and the energy storage battery is taken for granted. As examples instead of limitations, in some application scenarios, the traction battery may be a battery in an electric apparatus, and the energy storage battery may be a battery in a charging apparatus. For ease of description, the traction battery and the energy storage battery may be collectively referred to as a battery below.

At present, batteries on the market are generally rechargeable storage batteries, most of which are lithium batteries, such as lithium-ion batteries or lithium-ion polymer batteries. When a battery is disposed in an electric apparatus, the battery needs to be connected to a charging apparatus for charging if the remaining capacity of the battery is insufficient.

It should be noted that the highest voltage supported by a battery charging platform is rising for implementing fast battery charging. For example, an existing electric apparatus has been configured with an 800-volt high-voltage charging platform. However, construction of charging apparatuses is a gradual process. In commercial use environments, the construction of the charging apparatus that supports a high-voltage charging platform is far behind production of the electric apparatus.

Therefore, after an electric apparatus and a charging apparatus are connected, the electric apparatus and the charging apparatus are adapted in respect of a charging voltage, so as to determine whether the charging voltage of the charging apparatus is lower than a minimum charging voltage of a battery in the electric apparatus. If the charging voltage of the charging apparatus is lower than the minimum charging voltage, the charging apparatus cannot charge the electric apparatus.

To solve this problem, a voltage boosting module is added to the electric apparatus in related technologies. When the charging apparatus supports a low-voltage charging platform, the voltage boosting module boosts a charging voltage from the charging apparatus, converts the boosted charging voltage into a voltage signal matching the high-voltage platform, so as to charge the battery. However, this method increases the costs of the electric apparatus. In related technologies, the voltage boosting module is specially added for adapting an electric apparatus to all charging apparatuses. This increases the costs of the electric apparatus.

Based on this, this application provides a battery control circuitry, and in some embodiments, referring to FIG. 1, the battery control circuitry in FIG. 1 includes:

- a charging interface 10, a switch module or circuit 20, and a first battery pack 30, where a positive electrode of the first battery pack 30 may be connected to the switch module 20, and the switch module 20 is further connected to a positive electrode of the charging interface 10 and a negative electrode of the charging interface 10 respectively;
- a second battery pack 40, where a positive electrode of the second battery pack 40 is connected to a negative electrode of the first battery pack 30, and a negative electrode of the second battery pack 40 may be connected to the switch module 20; and
- a control module or circuit 50, where the control module 50 may be connected to a control end of the switch module 20, and may be configured to: when detecting that the charging interface 10 receives a charging signal from a low-voltage platform, control the switch module 20 to switch to a first connection state, where in the first connection state, a target battery pack is connected in series to the charging interface 10 to form a first loop, so as to charge the target battery pack, and the target battery pack is the first battery pack 30 or the second battery pack 40.

In this embodiment, the control module 50 and the switch module 20 are disposed. The control module 50 is configured to: when detecting that the charging interface 10 receives the charging signal from the low-voltage platform, control the switch module 20 to switch to the first connection state, where in this connection state, the target battery pack is connected in series to the charging interface 10 to form the first loop, so as to charge the target battery pack. The target battery pack is the first battery pack 30 or the second battery pack 40. In this way, either of the two battery packs can be charged separately. This implements adaptive access of the charging signal from the low-voltage platform so that battery packs can be charged properly, reducing costs. Therefore, the problem of higher costs caused by specially disposing a voltage boosting module in new energy vehicles for proper battery charging in the related technologies is resolved. In addition, only the control module 50 and the switch module 20 need to be disposed to implement proper battery charging, which features a simple structure and easy implementation.

Based on this, the negative electrode of the first battery pack 30 is directly connected to the positive electrode of the second battery pack 40 to separate the switch module 20 from the battery packs. This facilitates maintenance and reduces risks of battery pack disassembly.

In some optional examples, the charging interface 10 is a direct current charging interface 10. The electric apparatus in which a battery is disposed can be connected to the charging apparatus through the charging interface 10. For example, the charging apparatus may be a charging pile.

The first battery pack 30 and the second battery pack 40 are connected in series, so that battery cells in the first battery pack 30 and the second battery pack 40 may be connected in series. Optionally, the negative electrode of the first battery pack 30 and the positive electrode of the second battery pack 40 are electrically connected directly. The battery capacity of the first battery pack 30 is close to and even the same as that of the second battery pack 40.

The control module 50 may be a battery management unit or an independent charging control chip. The control module 50 can detect amplitude of voltage corresponding to a charging signal from the charging interface 10 and determines, according to the amplitude of voltage, whether the charging signal is from the low-voltage platform.

Alternatively, when the charging interface 10 is connected to the charging apparatus, the control module 50 acquires a charging protocol returned by the charging apparatus, and determines, according to the charging protocol, whether the charging signal belongs to the low-voltage platform.

The switch module 20 is connected to the positive electrode of the first battery pack 30, the negative electrode of the second battery pack 40, and a common end of the first battery pack 30 and the second battery pack 40. The common end is a joint connecting the negative electrode of the first battery pack 30 and the positive electrode of the second battery pack 40. The switch module 20 may be a single switch component or a combination of a plurality of switch components. The component may be a relay and/or a contactor, and certainly, may also be other switch chips adapting to charging control of the battery packs or other switch components. The quantity and structural setting of the switch module 20 are not limited in this embodiment, provided that switching to the first loop in the first connection state can be implemented based on the charging signal received by the control module 50.

Specifically, the first loop is a charging loop formed by connecting the charging interface 10 in series to any one battery pack when the switch module 20 is in the first connection state. After the first loop is formed, the charging signal of the low-voltage platform received by the charging interface 10 flows to a target battery pack connected in the first loop, to charge the target battery pack.

The low-voltage platform is relative to the high-voltage platform. The charging signals sent by the low-voltage platform and the high-voltage platform are both high-level signals that support battery charging. For example, the high-voltage platform is an 800V charging platform, and the low-voltage platform is a 400V charging platform.

It should also be noted that whether the target battery pack is the first battery pack 30 or the second battery pack 40 may be determined based on a remaining capacity of the battery pack. For example, a battery pack of a lower capacity may be preferably selected as the target battery pack. Furthermore, when the capacity of the target battery pack exceeds that of the other battery pack by a specific value, the target battery pack is switched. That is, the target battery pack is switched to the battery pack not being charged. In this way, the first battery pack 30 and the second battery pack 40 can be charged in turn, so as to achieve a balance in capacity between the two battery packs.

For example, the first battery pack 30, the second battery pack 40, and their lines may be further monitored for battery failure, and only the battery pack not faulty is charged if any one battery pack or its line is faulty. In this case, the battery pack not faulty is the target battery pack.

In other examples, if the remaining capacity of the first battery pack 30 is the same as or close to that of the second battery pack 40, the battery pack with a latest charging time being earlier may be the target battery pack.

In a specific example, the high-voltage platform is an 800V charging platform, the low-voltage platform is a 400V charging platform, the charging apparatus in which the first battery pack 30 and the second battery pack 40 are disposed is an 800V battery electric vehicle, and the voltages of the first battery pack 30 and the second battery pack 40 are 400V. When detecting that the charging interface 10 receives a charging signal from the 400V low-voltage platform, the control module 50 determines the first battery pack 30 with a lower remaining capacity as the target battery pack. The switch module 20 is controlled to switch setting, so that the switch module 20 is in the first connection state. In this connection state, the first battery pack 30 is connected in series to the charging interface 10 to form the first loop, so as to charge the first battery pack 30.

In the foregoing solution, the control module 50 detects the charging signal and switches the switch module 20 to form the first loop. In this way, for the electric apparatus with two battery packs connected in series, namely, an electric apparatus that supports the high-voltage platform, the battery packs are split into two battery packs that support the low-voltage platform, so as to be separately adapted to the charging signal of the low-voltage platform, for charging. Compared with the solution in which a voltage boosting module is disposed for adapting to the low-voltage platform, this solution reduces costs. Therefore, the problem of higher costs of electric apparatuses caused by specially disposing a voltage boosting module for proper battery charging in the related technologies is resolved.

Still referring to FIG. 1 and based on the foregoing embodiment, in another embodiment, the control module 50 is further configured to: when detecting that the charging interface 10 receives a charging signal from a high-voltage platform, control the switch module 20 to switch to a second connection state. In the second connection state, the first battery pack 30 and the second battery pack 40 are connected in series to form a second loop, so as to charge the first battery pack 30 and the second battery pack 40.

It can be understood that a single target battery pack can be charged when the charging signal of the low-voltage platform is received. When the charging signal of the high-voltage platform is received, batteries in the electric apparatus that are previously split into two battery packs for charging can be resumed. The control module 50 controls the switch module 20 to switch, so that the first battery pack 30 and the second battery pack 40 enter and form the second loop that supports charging of the high-voltage charging platform. In this way, the first battery pack 30 and the second battery pack 40 are charged adaptively.

In this embodiment, the control module 50 correspondingly switches the switch module 20 based on the charging signal of the high/low-voltage platform received by the charging interface 10, so that the battery packs and the charging interface 10 form the first loop or the second loop accordingly. In this way, the electric apparatus in which the battery packs are disposed can be adapted to different charging signals, implementing flexible charging mode and high adaptation.

Figure 2:
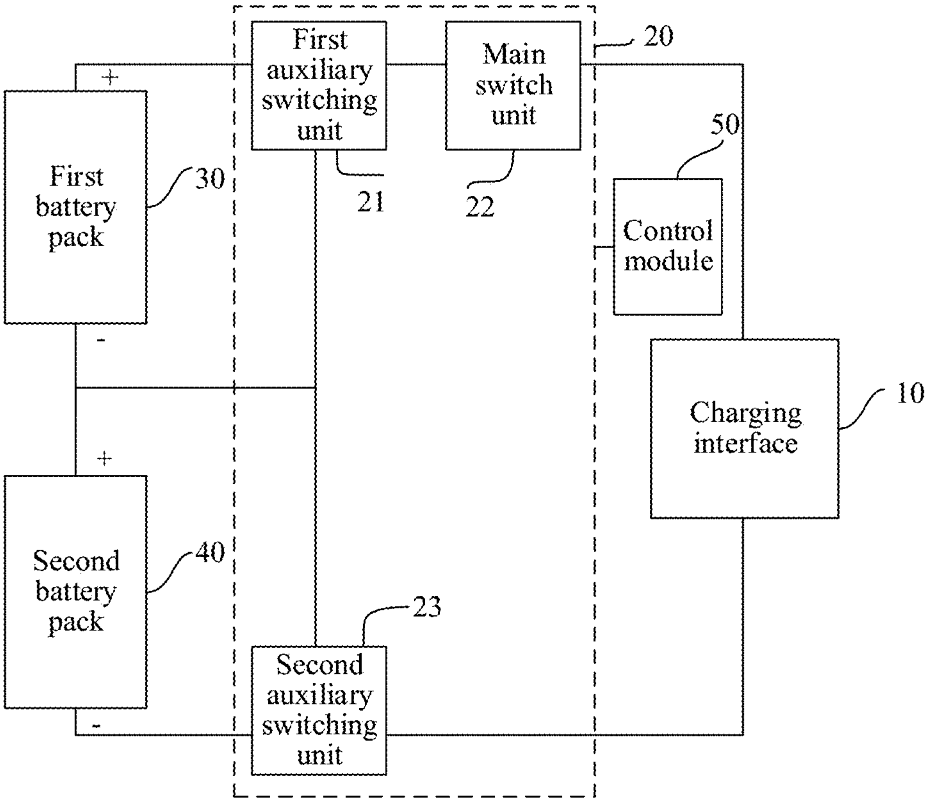
FIG. 2 is a schematic structural diagram of modules in a battery control circuitry according to another embodiment of this application.

Referring to FIG. 2 and based on the foregoing embodiment, in still another embodiment, the switch module 20 may include a first auxiliary switching unit or switcher 21, a second auxiliary switching unit or switcher 23, and a main switch unit switcher 22.

The first auxiliary switching unit 21 is connected to an output end of the main switch unit 22, a positive electrode of the first battery pack 30, and a positive electrode of the second battery pack 40. The first auxiliary switching unit 21 may be configured to conductively connect the output end of the main switch unit 22 to the target battery pack when receiving a first trigger signal from the control module 50. The first trigger signal is sent when the control module 50 detects the charging signal from the low-voltage platform.

An input end of the main switch unit 22 is connected to a positive electrode of the charging interface 10. The main switch unit 22 may be configured to turn on under triggering of the control module 50 after the first auxiliary switching unit 21 is conductively connected, so as to connect the positive electrode of the charging interface 10 to the output end of the main switch unit 22.

The second auxiliary switching unit 23 is connected to the negative electrode of the first battery pack 30, the negative electrode of the second battery pack 40, and the negative electrode of the charging interface 10. The second auxiliary switching unit 23 may be configured to turn on under triggering of the control module 50 after the main switch unit 22 is conductively connected, so as to connect the negative electrode of the target battery pack to the negative electrode of the charging interface 10.

The first auxiliary switching unit 21 may control the main switch unit 22 to connect to a positive electrode of any one battery pack, and the second auxiliary unit can control the negative electrode of the charging interface 10 to connect to a negative electrode of any one battery pack. The main switch unit 22 may control whether to connect a battery pack for charging based on the charging signal.

Specifically, in an example in which the charging interface 10 receives a charging signal of the low-voltage platform, when detecting that the charging interface 10 receives the charging signal, the control module 50 sends the first trigger signal to the first auxiliary switching unit 21, so that the first auxiliary switching unit 21 conductively connects the main switch unit 22 to the positive electrode of the target battery pack. When detecting that a line between the main switch unit 22 and the target battery pack is conductively connected, the control module 50 controls to conductively connect a line between the positive electrode of the charging interface 10 and the main switch unit 22. Then the control module 50 triggers the second auxiliary switching unit 23 to conductively connect the negative electrode of the target battery pack to the negative electrode of the charging interface 10, so as to form the first loop.

In the foregoing solution, the first auxiliary switching unit 21, the main switch unit 22, and the second auxiliary switching unit 23 are sequentially conductively connected to form the first loop. This helps improve charging safety.

In some optional examples, after detecting that the charging interface 10 receives the charging signal from the low-voltage platform and before conductively connecting the first auxiliary switching unit 21, the control module 50 may check whether the first auxiliary switching unit 21 and the second auxiliary switching unit 23 are normal.

If the first auxiliary switching unit 21 and the second auxiliary switching unit 23 are normal, the first trigger signal is sent to the first auxiliary switching unit 21. If the first auxiliary switching unit 21 or the second auxiliary switching unit 23 is faulty, a charging process of the target battery pack is terminated.

For example, a voltage test method may be used to check whether the first auxiliary switching unit 21 and the second auxiliary switching unit 23 are normal. If either of the auxiliary switching units is faulty, it indicates that the switch module 20 connected to the loop for the target battery pack is faulty. In this case, the charging process of the target battery pack needs to exit. By means of checking the auxiliary switching units connected to the loop for the target battery pack, fault detection can be implemented before charging, so as to improve charging safety.

In some optional examples, the control module 50 may be further configured to: after sending the first trigger signal to the first auxiliary switching unit 21, terminate the charging process of the target battery pack when the main switch unit 22 is faulty.

The control module 50 may be further configured to: when the main switch unit 22 is normal, send a second trigger signal to trigger to conductively connect the main switch unit 22.

It can be understood that fault detection of the main switch unit 22 helps check whether a main line from the charging interface 10 to the first battery pack 30 and the second battery pack 40 that are connected in series works properly. After it is detected that the main switch unit 22 is faulty, the control module 50 of the battery control circuitry may exit the charging process for the battery pack and feed back a faulty location to the main control of the electric apparatus, for line troubleshooting by maintenance engineers. This helps ensure safety of battery charging control.

Figure 3:
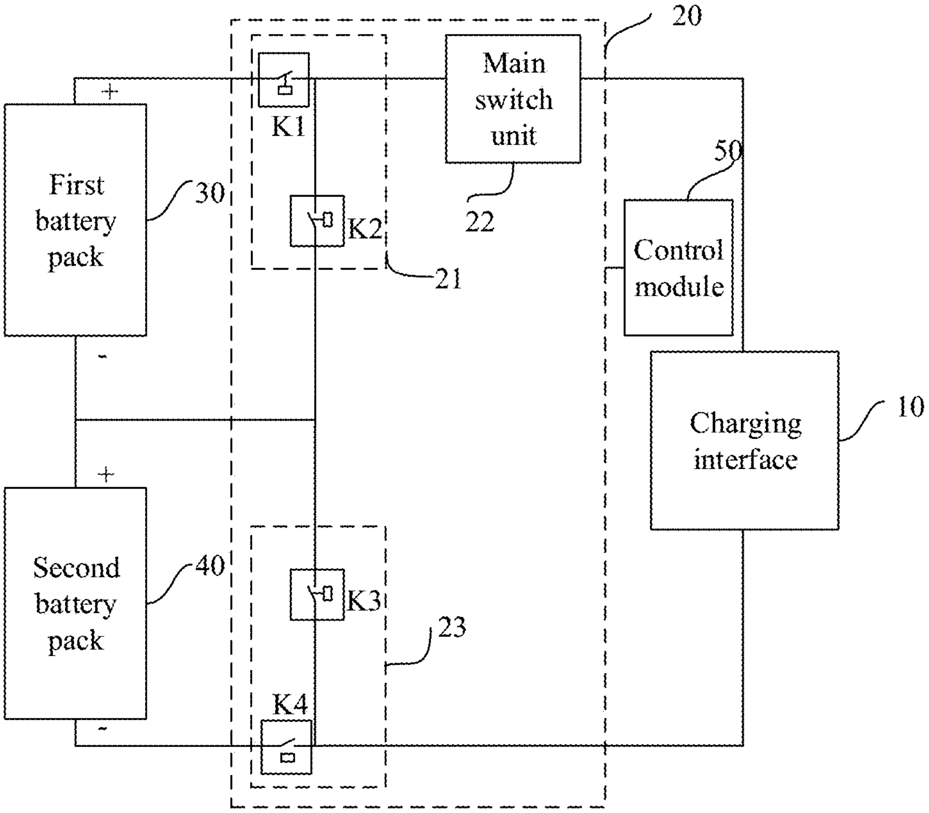
FIG. 3 is a schematic circuit structural diagram of a battery control circuitry according to still another embodiment of this application.

Referring to FIG. 3 and based on the battery control circuitry provided in the foregoing embodiment, in still another embodiment, the first auxiliary switching unit 21 may include:

- a first contactor K1; where a first end of the first contactor K1 is connected to the output end of the main switch unit 22, and a second end of the first contactor K1 is connected to the positive electrode of the first battery pack 30; and
- a second contactor K2, where a first end of the second contactor K2 is connected to the output end of the main switch unit 22, and a second end of the second contactor K2 is connected to the positive electrode of the second battery pack 40.

The second auxiliary switching unit 23 may further include:

- a third contactor K3, where a first end of the third contactor K3 is connected to the negative electrode of the charging interface 10, and a second end of the third contactor K3 is connected to the negative electrode of the first battery pack 30; and
- a fourth contactor K4, where a first end of the fourth contactor K4 is connected to the negative electrode of the charging interface 10, and a second end of the fourth contactor K4 is connected to the negative electrode of the second battery pack 40.

That is, each auxiliary switching unit is connected to one end of one battery pack through two contactors. It should be noted that, for the purpose of successfully connecting to the target battery pack or simultaneously charging the first battery pack 30 and the second battery pack 40, only one of the two contactors of each auxiliary switching unit can be conductively connected at one time.

Switchover can be implemented between different connection states of four contactors of the first auxiliary switching unit 21 and the second auxiliary switching unit 23. Based on the charging signal provided by the charging interface 10, the first battery pack 30 or the second battery pack 40 can be charged separately; or the first battery pack 30 and the second battery pack 40 are connected in series, to charge the first battery pack 30 and the second battery pack 40 simultaneously. In this way, the first loop and the second loop are switched flexibly.

In addition, a connection structure of the first contactor K1 to the fourth contactor K4 is disposed separate from the first battery pack 30 and the second battery pack 40, instead of being disposed between the first battery pack 30 and the second battery pack 40. This facilitates maintenance and reduces disassembly risks of the battery packs.

The third contactor K3 and the fourth contactor K4 are directly connected to the charging interface 10, and act as positive and negative contactors for direct current charging. The first contactor K1 and the second contactor K2 are auxiliary contactors.

It should also be noted that when the target battery pack is being charged separately, checking whether the first auxiliary switching unit 21 and the second auxiliary switching unit 23 is normal or faulty is actually checking whether the contactors connected to the target battery pack are faulty.

The following also uses charging the first battery pack 30 as a specific example for description. When the control module 50 switches the switch module 20, the first contactor K1 and the third contactor K3 are on and the second contactor K2 and the fourth contactor K4 are off. In this case, the first battery pack 30 acts as the target battery pack to connected to the first loop.

Specifically, when the control module 50 receives the charging signal from the low-voltage platform, a voltage test method can be used to check whether the voltage of the first contactor K1 and the third contactor K3 is within a preset range. If the voltage of the first contactor K1 and/or the third contactor K3 is beyond a normal range, it indicates that the auxiliary switching unit related to the first battery pack 30 is faulty, the first battery pack 30 cannot be charged subsequently, and an auxiliary charging line for the first battery pack 30 is faulty. Before the fault is removed, only the second battery pack 40 can be conductively connected for charging or discharging.

If the voltage is within the normal range, the control module 50 sends the first trigger signal to the first contactor K1 so that the first contactor K1 is conductively connected. Then it is checked whether the main switch unit 22 is faulty. If the main switch unit 22 is not faulty, the main switch and the third contactor K3 are conductively connected according to the charging process, so as to form the first loop for charging the first battery pack 30.

The charging control process for the second battery pack 40 is similar to that for the first battery pack 30 selected as the target battery pack, which can be referenced for setting, and details are not described herein again.

Figure 4:
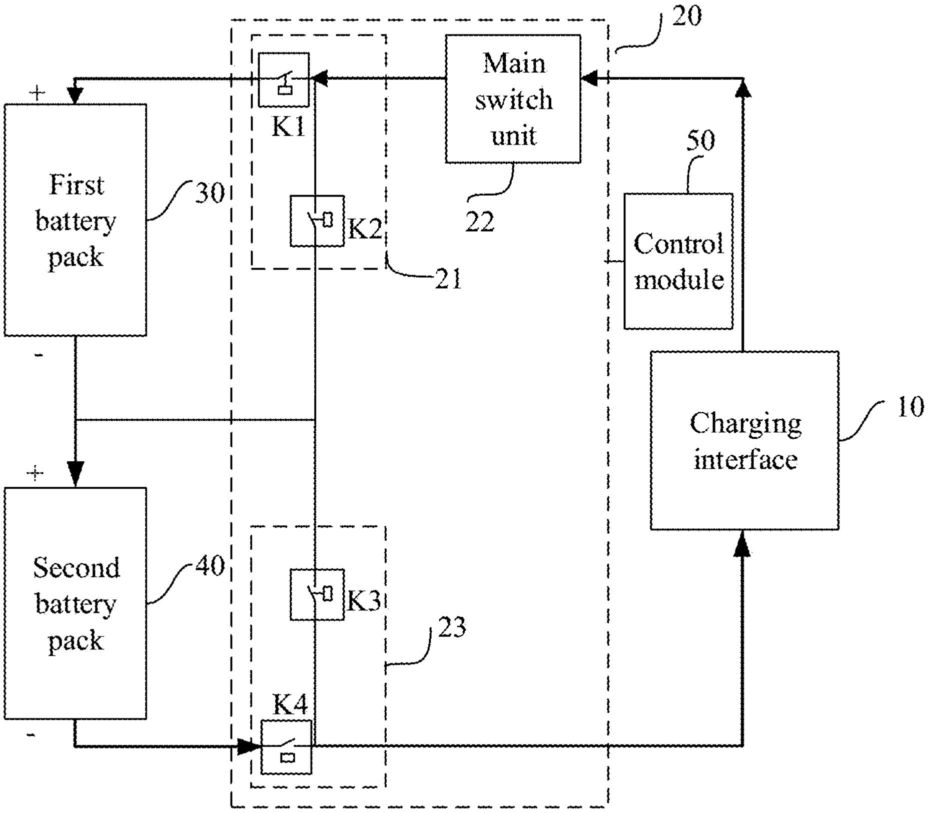
FIG. 4 is a schematic diagram of charging a first battery pack and a second battery pack in a battery control circuitry according to still another embodiment of this application.

Referring to FIG. 4, charging the first battery pack 30 and the second battery pack 40 together is used as an example. When the charging interface 10 receives a charging signal from a high-voltage platform, the first contactor K1 and the fourth contactor K4 are checked. If the first contactor K1 is faulty, the charging process exits. Before being repaired, the first contactor K1 is not conductively connected. In this case, the second contactor K2 belonging to the same auxiliary switching unit is used, so that charging or discharging a battery pack can be still implemented in a battery control line in a case that a contactor is faulty.

If the fourth contactor K4 is faulty, the charging process also exits. Before being repaired, the fourth contactor K4 is not conductively connected. In this case, the third contactor K3 belonging to the same auxiliary switching unit is used, so that charging or discharging a battery pack can be still implemented in a battery control line in a case that a contactor is faulty, and the vehicle can be driven at a lower power to a repair point or a safe place.

If the first contactor K1 and the fourth contactor K4 are normal, the first contactor K1, the fourth contactor K4, and the main switch unit 22 can be conductively connected, so that the charging signal from the high-voltage platform passes through the charging interface 10 to charge the first battery pack 30 and the second battery pack 40.

In the foregoing embodiment, fault detection is performed on contactors to check whether a line is faulty when a battery pack is being charged. If the line is normal, the control module 50 sequentially triggers switch units to be on, so that charging safety is ensured.

Figure 5:
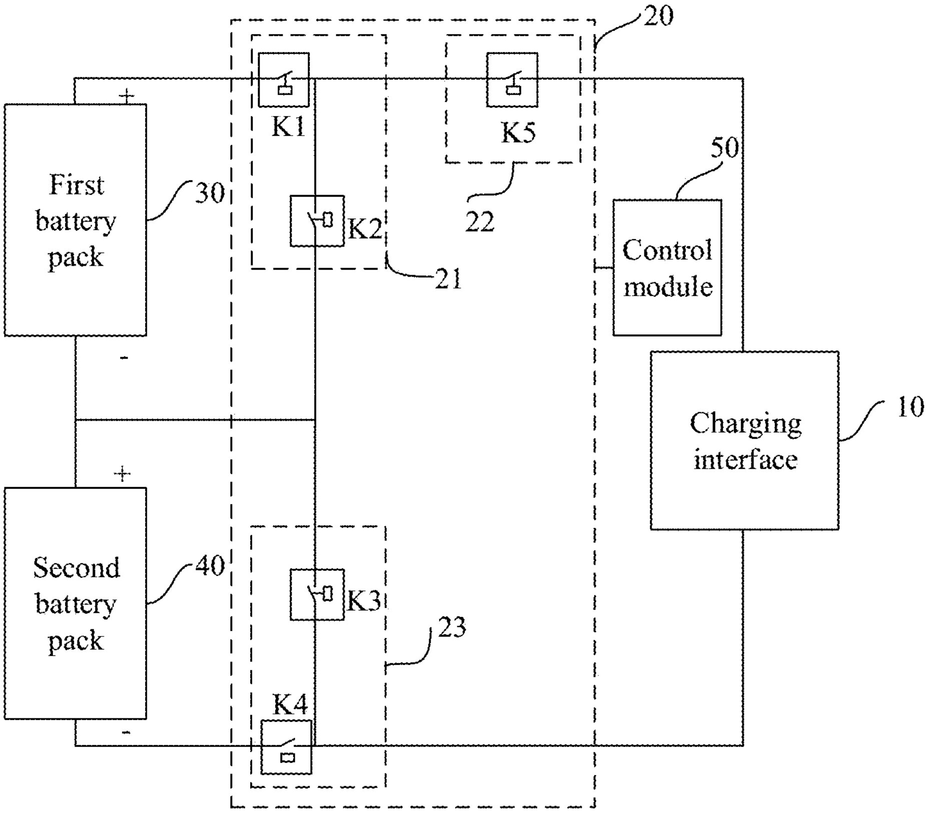
FIG. 5 is a schematic circuit structural diagram of a battery control circuitry according to yet another embodiment of this application.

Referring to FIG. 5 and based on the foregoing embodiments, in another embodiment, the main switch unit 22 may include a fifth contactor K5. A first end of the fifth contactor K5 is connected to the positive electrode of the charging interface 10, and a second end of the fifth contactor K5 is connected to the first end of the first contactor K1.

The fifth contactor K5 is directly connected to the charging interface 10, and may be a positive/negative contactor for direct current charging. A contactor is used as the main switch unit 22, featuring high reliability.

Figure 6:
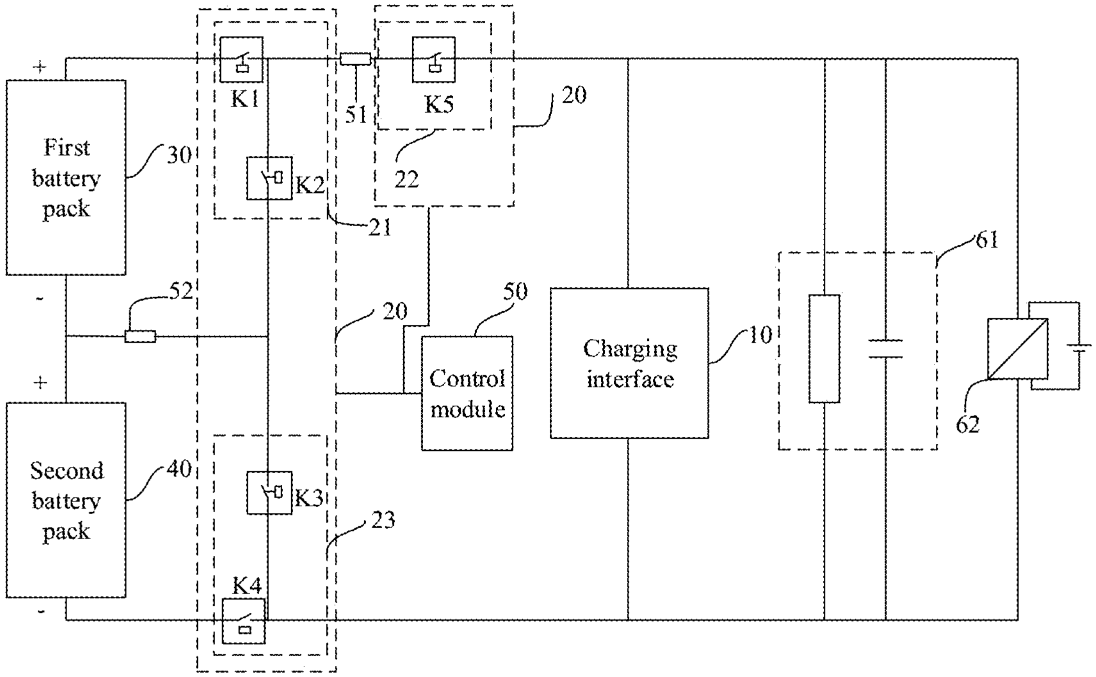
FIG. 6 is a schematic circuit structural diagram of a battery control circuitry according to yet another embodiment of this application.

Referring to FIG. 6 and based on the foregoing embodiments, in yet another embodiment, the battery control circuitry may further include: a first current protection module or circuit 51, connected to the output end of the main switch unit 22 and the first end of the first contactor K1; and a second current protection module or circuit 52, where a first end of the second protection module 52 is connected to the negative electrode of the first battery pack 30 and the positive electrode of the second battery pack 40, and a second end of the second current protection module 52 is connected to the second end of the second contactor K2 and the second end of the third contactor K3.

The first current protection module 51 and second current protection module each may be a fuse. When current to the charging interface 10 is overlarge, the first current protection module 51 can protect batteries and a line in which the batteries reside. The second current protection module 52 can implement current multiplex protection when different target battery packs are used.

Still Referring to FIG. 6 and based on the foregoing embodiments of the battery control circuitry, in yet another embodiment, the battery control circuitry further includes a high-voltage load 61 and a bidirectional DC-DC module or circuit 62. The high-voltage load 61 is disposed between the output end of the main switch unit 22 and the negative electrode of the charging interface 10. A low-voltage-side port of the bidirectional DC-DC module 62 is connected to a low-voltage power source. For example, the low-voltage power source may be a low-voltage storage battery whose voltage may be 12 volts. A high-voltage-side port of the bidirectional DC-DC module 62 is connected to the high-voltage load 61.

The high-voltage load 61 may include a main-loop load and a main-loop capacitor. The main-loop load may include a motor or an air-conditioning system of the electric apparatus. The main-loop load may be connected in parallel to the main-loop capacitor. A connection setting of the bidirectional DC-DC module 62 can ensure that the main-loop capacitor of the high-voltage load 61 is in a charging state all the time, reducing pre-charge contactors and pre-charge resistors in a circuit.

Still referring to FIG. 6, an example in which the first battery pack 30 supplies power to the high-voltage load 61 independently is used for description. When the second battery pack 40 is faulty or a contactor on the line in which the second battery pack 40 resides is faulty, the first battery pack 30 is used alone to supply power at a lower power. If the electric apparatus is a vehicle, the vehicle can be driven to a repair point or a safe place by using the first battery pack 30 at a lower power. In this case, the first contactor K1 and the third contactor K3 are on; the second contactor K2, the fourth contactor K4, and the fifth contactor K5 are off; and the first battery pack 30 supplies power to the high-voltage load 61 and may also supply power to a low-voltage power source through the bidirectional DC-DC module 62.

When the first battery pack 30 and the second battery pack 40 supply power externally, the first battery pack 30 and the second battery pack 40 are connected in series to act as the high-voltage platform to charge the high-voltage load 61. In this case, the first contactor K1 and the fourth contactor K4 are on, and the second contactor K2, the third contactor K3 and the fifth contactor K5 are off.

An embodiment of this application further provides an electric apparatus. The electric apparatus may be a vehicle, a ship, or a spacecraft. The electric apparatus includes the battery control circuitry provided in the foregoing embodiments, and therefore has all beneficial effects of the battery control circuitry provided in the foregoing embodiments.

Based on the battery control circuitry provided in the foregoing embodiments, an embodiment of this application provides a battery control method, including the following steps:

when detecting that a charging interface receives a charging signal from a low-voltage platform, controlling a switch module to switch to connect in series to a target battery pack and the charging interface to form a first loop, so as to charge the target battery pack, where the target battery pack is a first battery pack or a second battery pack; or when detecting that the charging interface receives a charging signal from a high-voltage platform, controlling the switch module to switch to connect in series to the charging interface, the first battery pack and the second battery pack to form a second loop, so as to charge the first battery pack and the second battery pack.

In the foregoing solution, the control module can switch the connection state of the switch module based on the detected charging signal of the low-voltage platform or high-voltage platform received by the charging interface, to form the first loop/the second loop. In this way, the battery pack can adapt to the high- or low-voltage platform, implementing flexible charging and high adaptability.

Although this application has been described with reference to the optional embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A battery control circuitry, comprising:

a charging interface, a switch circuit, and a first battery pack, the switch circuit including a first auxiliary switcher, a second auxiliary switcher, and a main switcher;

a second battery pack, wherein a positive electrode of the second battery pack is connected to a negative electrode of the first battery pack; and a control circuit, configured to:

in response to detecting that the charging interface receives a charging signal from a low-voltage platform, control the switch circuit to switch to a first connection state to form a first loop for charging a target battery pack, the target battery pack being the first battery pack or the second battery pack, by sequentially connecting the first auxiliary switcher, the main switcher, and the second auxiliary switcher, wherein the first auxiliary switcher is connected to an output end of the main switcher, a positive electrode of the first battery pack, and the positive electrode of the second battery pack, and is configured to:

in response to a first trigger signal is received from the control circuit, conductively connect the output end of the main switcher to the target battery pack, wherein the first trigger signal is sent in response to the control circuit detects the charging signal from the low-voltage platform;

an input end of the main switcher is connected to a positive electrode of the charging interface, and is configured to turn on under triggering of the control circuit after the first auxiliary switcher is conductively connected, so as to connect the positive electrode of the charging interface to the output end of the main switcher; and the second auxiliary switcher is connected to the negative electrode of the first battery pack, a negative electrode of the second battery pack, and a negative electrode of the charging interface, and is configured to turn on under triggering of the control circuit after the main switcher is conductively connected, so as to connect the negative electrode of the target battery pack to the negative electrode of the charging interface.

2. The battery control circuitry according to claim 1, wherein the control circuit is further configured to:

in response to detecting that the charging interface receives a charging signal from a high-voltage platform, control the switch circuit to switch to a second connection state, and in the second connection state, the charging interface, the first battery pack, and the second battery pack are connected in series to form a second loop, so as to charge the first battery pack and the second battery pack.

3. The battery control circuitry according to claim 1, wherein the control circuit is further configured to: after detecting that the charging interface receives the charging signal from the low-voltage platform, send the first trigger signal to the first auxiliary switcher on condition that the first auxiliary switcher and the second auxiliary switcher are detected to be normal; or terminate a charging process of the target battery pack on condition that the first auxiliary switcher and the second auxiliary switcher are detected to be faulty.

4. The battery control circuitry according to claim 1, wherein the control circuit is further configured to: after sending the first trigger signal to the first auxiliary switcher, terminate a charging process of the target battery pack on condition that the main switcher is faulty; or send, on condition that the main switcher is normal, a second trigger signal to trigger connection of the main switcher.

5. The battery control circuitry according to claim 1, wherein the first auxiliary switcher comprises:

a first contactor, wherein a first end of the first contactor is connected to the output end of the main switcher, and a second end of the first contactor is connected to the positive electrode of the first battery pack; and a second contactor, wherein a first end of the second contactor is connected to the output end of the main switcher, and a second end of the second contactor is connected to the positive electrode of the second battery pack; and the second auxiliary switcher comprises:

a third contactor, wherein a first end of the third contactor is connected to the negative electrode of the charging interface, and a second end of the third contactor is connected to the negative electrode of the first battery pack; and a fourth contactor, wherein a first end of the fourth contactor is connected to the negative electrode of the charging interface, and a second end of the fourth contactor is connected to the negative electrode of the second battery pack.

6. The battery control circuitry according to claim 5, wherein the main switcher comprises:

a fifth contactor, wherein a first end of the fifth contactor is connected to the positive electrode of the charging interface, and a second end of the fifth contactor is connected to the first end of the first contactor.

7. The battery control circuitry according to claim 5, further comprising:

a first current protection circuit, connected to the output end of the main switcher and the first end of the first contactor; and a second current protection circuit, wherein a first end of the second current protection circuit is connected to the negative electrode of the first battery pack and the positive electrode of the second battery pack, and a second end of the second current protection circuit is connected to the second end of the second contactor and the second end of the third contactor.

8. The battery control circuitry according to claim 1, further comprising:

a high-voltage load, disposed between the output end of the main switcher and the negative electrode of the charging interface; and a bidirectional DC-DC circuit, wherein a low-voltage-side port of the bidirectional DC-DC circuit is connected to a low-voltage power source, and a high-voltage-side port of the bidirectional DC-DC circuit is connected to the high-voltage load.

9. The battery control circuitry according to claim 1, wherein sequentially connecting the first auxiliary switcher, the main switcher, and the second auxiliary switcher to form the first loop comprises:

first, conductively connecting an output end of the main switcher to the target battery pack via the first auxiliary switcher;

second, after detecting that a line between the main switcher and the target battery pack is conductively connected, triggering the main switcher to turn on to connect the positive electrode of the charging interface to the output end of the main switcher; and third, after the main switcher is conductively connected, triggering the second auxiliary switcher to connect the negative electrode of the target battery pack to the negative electrode of the charging interface.

10. The battery control circuitry according to claim 1, wherein the control circuit is further configured to:

after detecting that the charging interface receives the charging signal from the low-voltage platform and before conductively connecting the first auxiliary switcher, check whether the first auxiliary switcher and the second auxiliary switcher are within a preset range using a voltage test method.

11. The battery control circuitry according to claim 10, wherein checking using the voltage test method includes checking whether a voltage of a first contactor (K1) of the first auxiliary switcher and a third contactor (K3) of the second auxiliary switcher is within the preset range.

12. The battery control circuitry according to claim 11, wherein the control circuit is further configured to:

upon determining that the voltage of the first contactor (K1) or the third contactor (K3) is beyond the preset range, identify an auxiliary charging line related to the first battery pack as faulty and exclusively conductively connect the second battery pack for charging or discharging.

13. An electric apparatus, comprising:

a battery control circuitry, including a charging interface, a switch circuit, and a first battery pack, the switch circuit including a first auxiliary switcher, a second auxiliary switcher, and a main switcher;

a second battery pack, wherein a positive electrode of the second battery pack is connected to a negative electrode of the first battery pack; and a control circuit, configured to:

in response to detecting that the charging interface receives a charging signal from a low-voltage platform, control the switch circuit to switch to a first connection state to form a first loop for charging a target battery pack, the target battery pack being the first battery pack or the second battery pack, by sequentially connecting the first auxiliary switcher, the main switcher, and the second auxiliary switcher, wherein the first auxiliary switcher is configured to, in response to a first trigger signal received from the control circuit, conductively connect an output end of the main switcher to the target battery pack, wherein the first trigger signal is sent in response to the control circuit detecting the charging signal from the low-voltage platform;

the main switcher is configured to turn on under triggering of the control circuit after the first auxiliary switcher is conductively connected, so as to connect a positive electrode of the charging interface to the output end of the main switcher; and the second auxiliary switcher is configured to turn on under triggering of the control circuit after the main switcher is conductively connected, so as to connect a negative electrode of the target battery pack to a negative electrode of the charging interface.

14. A battery control method, comprising:

providing a battery control circuitry, including a charging interface, a switch circuit, and a first battery pack, the switch circuit including a first auxiliary switcher, a second auxiliary switcher, and a main switcher;

a second battery pack, wherein a positive electrode of the second battery pack is connected to a negative electrode of the first battery pack; and a control circuit, configured to:

in response to detecting that the charging interface receives a charging signal from a low-voltage platform, control the switch circuit to switch to a first connection state to form a first loop for charging a target battery pack, the target battery pack being the first battery pack or the second battery pack, by sequentially connecting the first auxiliary switcher, the main switcher, and the second auxiliary switcher, wherein the method further includes in response to detecting that the charging interface receives the charging signal from the low-voltage platform, controlling the switch circuit to switch to connect in series to the target battery pack and the charging interface to form the first loop, so as to charge the target battery pack, wherein the target battery pack is the first battery pack or the second battery pack; or in response to detecting that the charging interface receives a charging signal from a high-voltage platform, controlling the switch circuit to switch to connect in series to the charging interface, the first battery pack and the second battery pack to form a second loop, so as to charge the first battery pack and the second battery pack.

15. The battery control method according to claim 14, further comprising:

in response to a first trigger signal is received from the control circuit, conductively connecting an output end of the main switcher to the target battery pack by a first auxiliary switcher, wherein the first trigger signal is sent in response to the control circuit detects the charging signal from the low-voltage platform;

turning on the main switcher under triggering of the control circuit after the first auxiliary switcher is conductively connected, so as to connect a positive electrode of the charging interface to the output end of the main switcher; and turning on the second auxiliary switcher under triggering of the control circuit after the main switcher is conductively connected, so as to connect a negative electrode of the target battery pack to the negative electrode of the charging interface.

16. The battery control method according to claim 15, further comprising:

after detecting that the charging interface receives the charging signal from the low-voltage platform, sending the first trigger signal to the first auxiliary switcher on condition that the first auxiliary switcher and the second auxiliary switcher are detected to be normal; or terminating a charging process of the target battery pack on condition that the first auxiliary switcher and the second auxiliary switcher are detected to be faulty.

17. The battery control method according to claim 15, further comprising:

after sending the first trigger signal to the first auxiliary switcher, terminating a charging process of the target battery pack on condition that the main switcher is faulty; or sending, on condition that the main switcher is normal, a second trigger signal to trigger connection of the main switcher.

18. The battery control method according to claim 15, wherein the first auxiliary switcher comprises:

a first contactor, wherein a first end of the first contactor is connected to the output end of the main switcher, and a second end of the first contactor is connected to the positive electrode of the first battery pack; and a second contactor, wherein a first end of the second contactor is connected to the output end of the main switcher, and a second end of the second contactor is connected to the positive electrode of the second battery pack; and the second auxiliary switcher comprises:

a third contactor, wherein a first end of the third contactor is connected to the negative electrode of the charging interface, and a second end of the third contactor is connected to the negative electrode of the first battery pack; and a fourth contactor, wherein a first end of the fourth contactor is connected to the negative electrode of the charging interface, and a second end of the fourth contactor is connected to the negative electrode of the second battery pack.

19. The battery control method according to claim 18, wherein the main switcher comprises:

a fifth contactor, wherein a first end of the fifth contactor is connected to the positive electrode of the charging interface, and a second end of the fifth contactor is connected to the first end of the first contactor.

* * * * *